Sept. 3, 1968     G. E. WILLIAMS     3,399,707
TIRE CONSTRUCTION
Filed Nov. 12, 1965     2 Sheets-Sheet 1
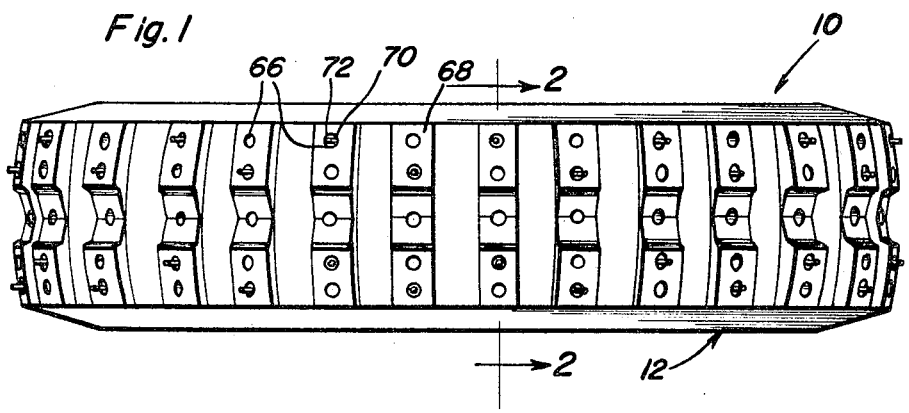
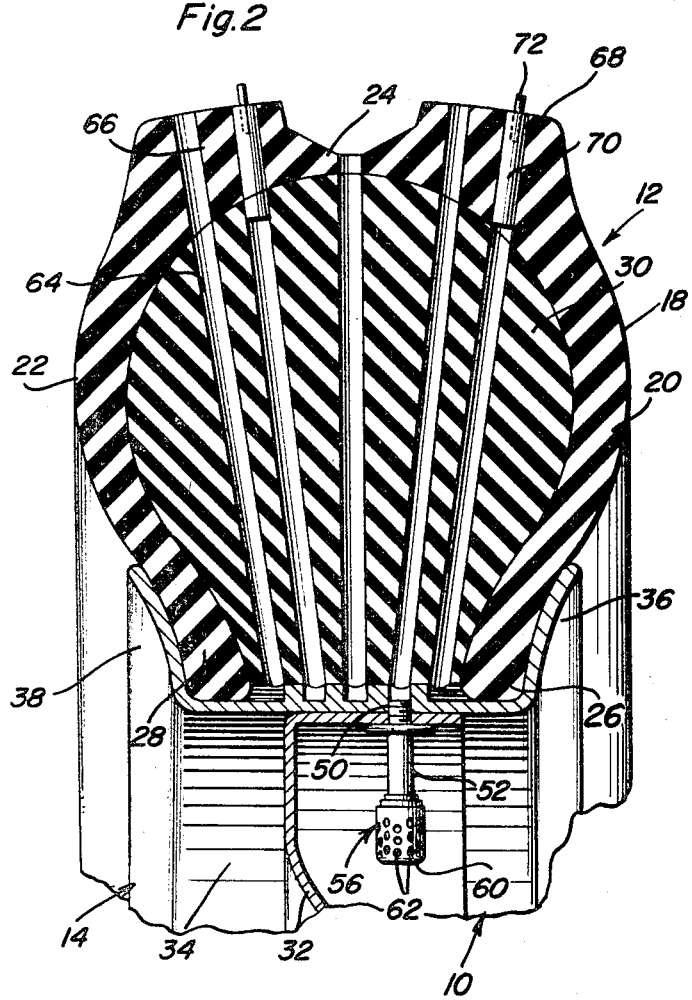
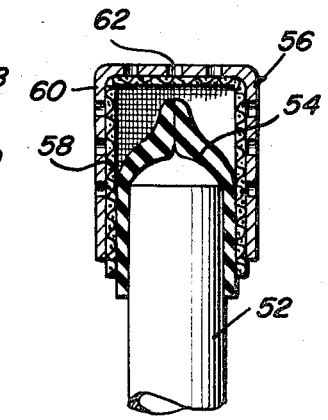
Gordon E. Williams
INVENTOR.

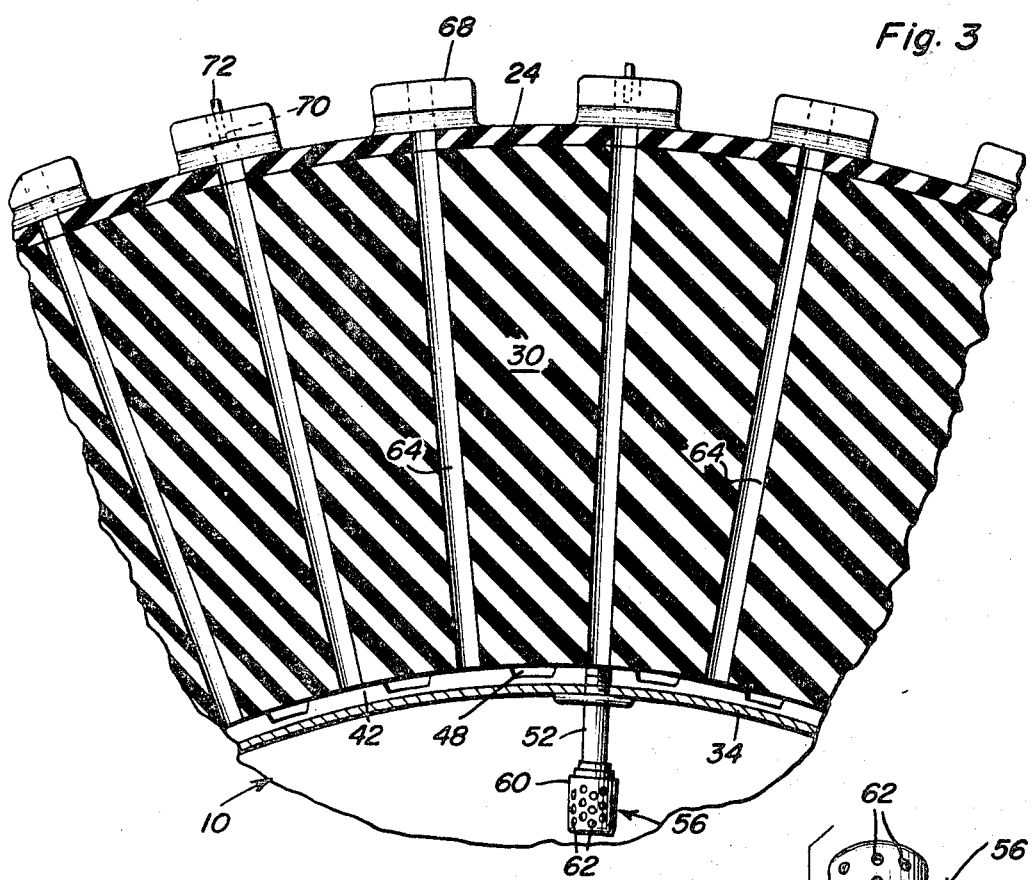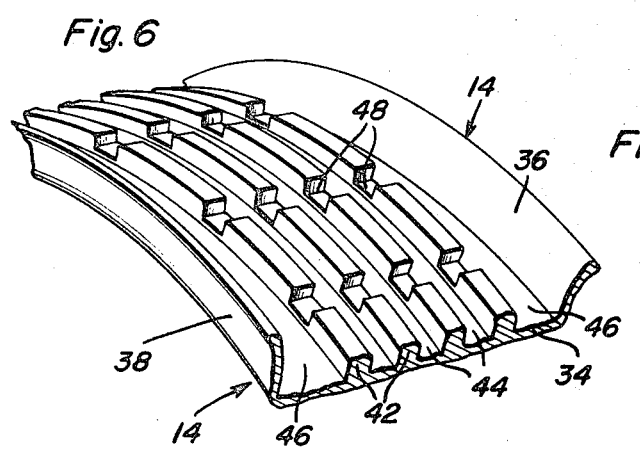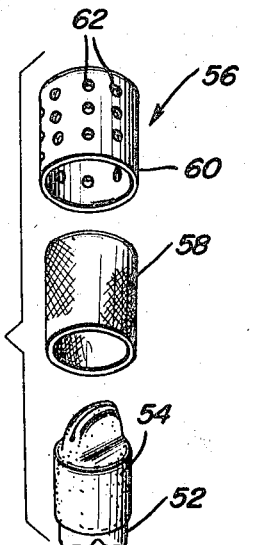

United States Patent Office 3,399,707
Patented Sept. 3, 1968

3,399,707
TIRE CONSTRUCTION
Gordon E. Williams, 113 Goddard St.,
Athol, Mass. 01331
Filed Nov. 12, 1965, Ser. No. 507,365
8 Claims. (Cl. 152—321)

ABSTRACT OF THE DISCLOSURE

A generally solid tire construction for disposition between the bead retaining flange portions of a wheel rim with an annular space defined between the inner peripheral portion of the tire construction and the opposing portions of the wheel rim spaced intermediate the bead retaining flanges thereof, the tire construction including generally radial and circumferentially spaced cooling air passages opening radially outwardly of the tread portion of the tire construction and radially inwardly into the annular space between the wheel rim and inner peripheral portions of the tire construction.

---

This invention relates to a novel and useful improved tire construction and more specifically to a tire construction utilizing a more or less conventional tire casing such as those commonly termed pneumatic tire casings. However, the tire casing of the instant invention is not designed to be supported by air pressure therein either held captive by the tire casing alone or a tube disposed within the tire casing but instead includes a substantially solid filler constructed of resilient material.

Development of new forms of vehicle tires has for a long time included the contemplation of a tire casing filled with a solid but resilient filler. However, the main drawback of such a tire construction is that the tire casing and substantially solid but resilient filler disposed therein generate excessive heat due to flexing while the tire construction is rolling at high speeds and carrying more than minimal loads.

It is therefore the main object of this invention to provide an improved tire construction of the type including a more or less conventional tire casing filled with a substantially solid but resilient filler and including air cooling means whereby the excessive heat generated by such a tire construction will be dissipated as it builds up with the heat dissipation being sufficiently rapid to maintain operating temperatures similar to those which are maintained by conventional pneumatic tire constructions supported by air pressure disposed therein.

Another object of this invention, in accordance with the immediately preceding object, is to utilize portions of the air cooling system of the tire construction of the instant invention in colder weather, when the full cooling capacity of the improved tire construction is not needed, to provide a means whereby traction improving lugs in the form of generally radially outwardly projecting pins or rods may be supported by the improved tire construction of the instant invention and utilized to greatly improve the traction afforded thereby on snowy and icy road surfaces.

A final object of this invention to be specifically enumerated herein is to provide an improved tire construction in accordance with the preceding objects which will conform to conventional forms of manufacture, be of simple construction and conventional in use so as to provide a device that will be economically feasible, long lasting and differ little in use from conventional tire constructions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a tire construction in accordance with the present invention;

FIGURE 2 is a fragmentary transverse vertical sectional view taken substantially upon the plane indicated by the section line 2—2 of FIGURE 1;

FIGURE 3 is a fragmentary vertical sectional view taken substantially upon a plane passing through that portion of the tire construction illustrated in FIGURE 2;

FIGURE 4 is an enlarged fragmentary sectional view of an air vent portion of the tire construction of the instant invention taken substantially upon a plane passing through the center of the air vent construction;

FIGURE 5 is an exploded perspective view of the valved end portion of the vent construction illustrated in FIGURE 4; and FIGURE 6 is a fragmentary perspective view of a modified form of rim construction adapted to be utilized in conjunction with the improved tire construction of the instant invention.

Referring now more specifically to the drawings, the numeral 10 generally designates a vehicle wheel comprising an improved tire construction generally referred to by the reference numeral 12 constructed in accordance with the present invention and an improved wheel rim construction generally referred to by the reference numeral 14 and designed specifically for use with the tire construction 12.

As can best be seen from a comparison of FIGURES 2 and 3 of the drawings, the tire construction 12 includes a more or less conventional tire casing 18 including annular opposite side wall portions 20 and 22 interconnected at their outer peripheral portions by means of an integral crown or tread portion 24. The inner peripheral portions of the side walls 20 and 22 include bead portions 26 and 28, respectively.

The interior of the casing 18 is substantially filled with an annular generally doughnut-shaped filler or body 30 constructed of resilient and deformable material such as rubber.

The wheel rim construction 14 of the vehicle wheel assembly 10 includes a center web portion 32 adapted to be secured to a vehicle hub in any convenient manner and a generally cylindrical rim portion 34 including opposite end circumferentially extending and laterally outwardly projecting flange portions 36 and 38 between which the bead portions 26 and 28 of the tire casing 18 are disposed in order to maintain the casing 18 on the wheel rim construction 14.

The rim portion 34 includes a plurality of axially spaced circumferentially extending and radially outwardly projecting ribs 42 disposed between and spaced axially from the retaining flange portions 36 and 38 defining air passage grooves 44 between the ribs 42 and air passage grooves 46 between the endmost ribs 42 and the flanges or flange portions 36 and 38. In addition, each of the ribs 44 includes a plurality of circumferentially spaced transversely extending notches 48 whereby adjacent grooves 44 and 46 are disposed in communication with each other.

The rim portion 34 is provided with a threaded aperture 50 and the base end portion of an air vent tube 52 is threadedly secured in the aperture 50. The outer end portion of the tube 52 which is disposed radially innermost of the vehicle wheel assembly 10 has a resilient one-way check valve 54 secured thereon and covered by means of an air cleaner cap assembly generally referred to by the reference numeral 56. The air cleaner cap assembly 56 includes an inner cap 58 telescoped over the control valve 54 and constructed of wire-like mesh and an outer cap 60 constructed of rigid material but provided with a plurality of air apertures 62.

The bead portions 26 and 28 of the casing 18 are seated in the remote portions of the grooves 46 and the filler 30 and casing 18 include a plurality of pairs of generally radially projecting and aligned bores 64 and 66 which open radially inwardly of the filler or body 30 in alignment with the grooves 44 and 46 and radially outwardly through the tread surface 68 of the crown or tread portion 24 of the casing 18.

The aperture 50 opens into one of the grooves 44 and is thereby communicated with all of the grooves 44 and 46 and therefore also with the radial innermost ends of the bores 64.

In operation, as the vehicle wheel assembly 10 is rolling over a suitable supporting surface while carrying a load, flexing of the tire casing 18 and the filler or body 30 tends to force air radially inwardly through the bores 66 and 64 and into the grooves 44 and 46. Should the pressure within the grooves 44 and 46 exceed the pressure of the ambient atmosphere, a portion of the air trapped within the grooves 44 and 46 will pass outwardly through the tube 52 and the control valve 54. In this manner, a constant flow of air will be effected radially inwardly of the tire construction 12 entering through the tread surface 68 and passing outwardly of the control valve 54.

In addition to the normal flexing of the casing 18 and the filler or body 30 causing air to pass radially inwardly through the bores 66 and 64, forward movement of the vehicle wheel assembly 10 will cause air to be rammed in the outer ends of the bores 66 through that portion of the tire casing 18 approaching its supporting surface during its rolling action. Likewise, there is a partial vacuum formed behind a tire rolling at high speed and this partial vacuum will cause air from the grooves 44 and 46 to pass outwardly through those bores 64 and 66 formed in the body 30 and the tire casing 18 at the rear of the vehicle wheel assembly 10 in relation to its direction of movement.

When cooler weather is experienced and there is a threat of slippery road conditions caused by freezing rain and snow, certain selected bores 66 may be blocked inasmuch as the maximum cooling capacity of the tire construction 12 is not needed during cold weather and these blocked bores 66 may be blocked by means of cylindrical bodies 70 secured within the bores 66 in any convenient manner and including axially projecting studs or pins 72 which project radially outwardly of the tread surface 68. These pins 72 will, of course, increase the maximum traction to be obtained by the tire construction 12 on slippery road surfaces. Of course, when warmer weather is encountered, the cylindrical bodies 70 may be removed in order that the bores 66 in which they were temporarily secured may again be utilized for air cooling passages.

Further, the tread surface 68 of the tire construction 12 may be defined by any suitable tread design including either transverse bars, circumferentially extending ribs, or interlocked V-shaped tread elements.

If it is desired, the cylindrical bodies 70 may include one or more radially outwardly and circumferentially extending ribs removably received in complementary circumferential inwardly opening grooves formed in the bores 66 in which the bodies 70 are disposed thereby providing a means to releasably secure the bodies in these bores 66.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle tire construction comprising a tire casing including a pair of annular opposite side wall portions interconnected at their outer peripheral portions by means of an integral crown portion and with their inner peripheral portions defining bead portions adapted to be seated against wheel rim flange portions disposed outwardly thereof, said crown portion having air cooling passages formed therein opening outwardly of the outer and inner surfaces of said crown portion at their opposite ends, a substantially solid annular filler assembly constructed of resilient deformable material disposed within and substantially filling the interior of said casing disposed between said side walls and including air passages spaced circumferentially thereabout opening outwardly through the outer peripheral surfaces of said filler assembly in registry with at least some of the radial innermost ends of said air cooling passages and opening inwardly of the inner peripheral portions of said annular filler assembly at their inner ends.

2. The combination of claim 1 wherein said air cooling passages extend generally radially of said casing and those passages of said air cooling passages disposed on opposite sides of the medial plane of said casing are slightly inclined toward said medial plane at their inner ends.

3. The combination of claim 1 including a vehicle wheel rim, said rim including a generally cylindrical rim portion having a pair of circumferentially extending and generally radially outwardly projecting flange portions on its opposite ends, said casing and filler assembly being disposed on said cylindrical rim portion with said bead portions abutted against the inner surfaces of said circumferential flange portions, the outer surfaces of said cylindrical rim portion including communicated axially spaced circumferentially extending grooves for receiving cooling air from the radial innermost ends of the first-mentioned air passages, and valved air outlet means carried by said cylindrical rim portion and operable to pass air from within the tire construction outwardly into the ambient atmosphere and to prevent a reverse flow of air from the ambient atmosphere through said valved air outlet means and into the interior of the tire construction.

4. The combination of claim 1 wherein at least the outer ends of said air cooling passages have generally cylindrical bodies removably secured therein and in and from which generally axially projecting studs are disposed and project, respectively, said studs including free end portions projecting generally radially outwardly of the outer peripheral portions of said crown portion.

5. The combination of claim 1 including a vehicle wheel rim, said rim including a generally cylindrical rim portion having a pair of circumferentially extending and generally radially outwardly projecting flange portions on its opposite ends, said casing and filler assembly being disposed on said cylindrical rim portion with said bead portions abutted against the inner surfaces of said circumferential flange portions, the outer surfaces of said cylindrical rim portion including communicated axially spaced circumferentially extending grooves for receiving cooling air from the radial innermost ends of the first-mentioned air passages, and valved air outlet means carried by said cylindrical rim portion and operable to pass air from within the tire construction outwardly into the ambient atmosphere and to prevent a reverse flow of air from the ambient atmosphere through said valved air outlet means and into the interior of the tire construction, the endmost circumferential grooves defined in the outer surfaces of said cylindrical rim portion being disposed adjacent and having their remote extremities defined by said circumferential flange portions, said bead portions being disposed in said remote extremities.

6. The combination of claim 5 wherein at least the outer ends of some of said air cooling passages have generally cylindrical bodies removably secured therein and in and from which generally axially projecting studs are disposed and project, respectively, said studs including free end portions projecting generally radially outwardly of the outer peripheral portions of said crown portion.

7. A generally solid annular tire construction of resilient deformable material including an outer peripheral crown or tread portion and an inner peripheral portion, a wheel rim including a generally cylindrical rim portion having a pair of circumferentially extending and generally radially outwardly projecting flange portions on its opposite ends, said tire construction being mounted on said rim with its inner peripheral portions seated between and against said flange portions, said tire construction including air passages formed therein including one set of corresponding ends opening outwardly through said tread portion and a second set of corresponding ends opening through said inner peripheral portion, said tire construction and rim defining an annular cavity between said cylindrical rim portion and said inner peripheral portion communicating the inner ends of at least some of said air cooling passages, and valved air outlet means carried by said cylindrical rim portion and operable to pass air from within said cavity outwardly into the ambient atmosphere and to prevent a reverse flow of air from the ambient atmosphere through said valved air outlet means and into said cavity.

8. The combination of claim 7 wherein at least the outer ends of some of said air cooling passages opening through said tread portion have generally cylindrical bodies removably secured therein and from which axially projecting studs are disposed and project, respectively, said studs including free end portions projecting generally radially outwardly of the outer peripheral portions of said crown portion.

References Cited
UNITED STATES PATENTS

| | | | |
|---|---|---|---|
| 993,957 | 5/1911 | Carmody | 152—153 XR |
| 3,126,041 | 3/1964 | Williams | 152—315 |

ARTHUR L. LA POINT, *Primary Examiner.*